(12) United States Patent
Xiaoang et al.

(10) Patent No.: US 10,458,869 B2
(45) Date of Patent: Oct. 29, 2019

(54) PROCESS PRESSURE TRANSMITTER WITH SEAL HAVING DIAMOND LIKE CARBON COATING

(71) Applicant: Rosemount Inc., Chanhassen, MN (US)

(72) Inventors: Zhang Xiaoang, Beijing (CN); Vincent Cline, Brenham, TX (US)

(73) Assignee: ROSEMOUNT INC., Chanhassen, MN (US)

( * ) Notice: Subject to any disclaimer, the term of this patent is extended or adjusted under 35 U.S.C. 154(b) by 703 days.

(21) Appl. No.: 14/483,301

(22) Filed: Sep. 11, 2014

(65) Prior Publication Data

US 2015/0377730 A1    Dec. 31, 2015

(30) Foreign Application Priority Data

Jun. 30, 2014   (CN) .......................... 2014 1 0306576

(51) Int. Cl.
| | |
|---|---|
| *G01L 19/06* | (2006.01) |
| *G01L 9/00* | (2006.01) |
| *G01L 13/02* | (2006.01) |
| *G01L 19/00* | (2006.01) |
| *G01L 7/08* | (2006.01) |

(52) U.S. Cl.
CPC ............ *G01L 9/0072* (2013.01); *G01L 7/082* (2013.01); *G01L 13/026* (2013.01); *G01L 19/0046* (2013.01); *G01L 19/0645* (2013.01); *G01L 2009/0067* (2013.01)

(58) Field of Classification Search
CPC ......... G01L 2009/0067; G01L 19/0645; G01L 19/0046; G01L 13/026
See application file for complete search history.

(56) References Cited

U.S. PATENT DOCUMENTS

| 5,241,131 A | 8/1993 | Bakhru et al. |
| 6,038,961 A | 3/2000 | Filippi et al. |

(Continued)

FOREIGN PATENT DOCUMENTS

| CN | 101078664 | 11/2007 |
| CN | 103201607 | 7/2013 |

(Continued)

OTHER PUBLICATIONS

Communication Pursuant ro Rules 161(1) and 162 EPC from European Patent Application No. 15733953.2, dated Feb. 7, 2017.

(Continued)

*Primary Examiner* — Herbert K Roberts

(74) *Attorney, Agent, or Firm* — Westman, Champlin & Koehler, P.A.

(57) ABSTRACT

A process pressure transmitter system includes a process pressure transmitter housing, a process pressure sensor in the process pressure transmitter housing, a flange face in the process pressure transmitter housing and an isolation diaphragm on the flange face. A first capillary passageway carries a first fill fluid from the isolation diaphragm to the process pressure sensor. A process seal diaphragm couples to a process fluid of the industrial process. A second capillary passageway carries a second fill fluid from the process seal diaphragm to the isolation diaphragm. A diamond like carbon (DLC) coating coats the process seal diaphragm.

14 Claims, 6 Drawing Sheets

(56) References Cited

U.S. PATENT DOCUMENTS

| | | | |
|---|---|---|---|
| 7,409,865 B2 | 8/2008 | Greenwood | |
| 7,454,975 B2 | 11/2008 | Louwagie et al. | |
| 8,014,104 B2 | 9/2011 | Cheng et al. | |
| 8,343,593 B2 | 1/2013 | Boardman et al. | |
| 8,720,277 B2 | 5/2014 | Norberg et al. | |
| 9,383,280 B2 | 7/2016 | Bastiaan et al. | |
| 2006/0011468 A1* | 1/2006 | Boardman | C23C 16/045 204/192.12 |
| 2007/0113662 A1 | 5/2007 | Greenwood | |
| 2007/0220985 A1* | 9/2007 | Hedtke | G01L 19/0007 73/715 |
| 2007/0234813 A1 | 10/2007 | Hedtke | |
| 2007/0275495 A1 | 11/2007 | Mayer et al. | |
| 2011/0162751 A1* | 7/2011 | Fitzgerald | C23C 30/00 138/145 |
| 2013/0263678 A1* | 10/2013 | Bastiaan | G01L 7/082 73/862.581 |

FOREIGN PATENT DOCUMENTS

| | | |
|---|---|---|
| CN | 103454031 | 12/2013 |
| JP | H11351991 A | 12/1999 |
| JP | 20080234828 A | 10/2008 |
| JP | 2010084821 A | 4/2010 |
| JP | 2011521106 A | 7/2011 |
| JP | 2010523975 A | 12/2017 |
| WO | WO 2011/078976 | 6/2011 |
| WO | 2012/064190 A1 | 5/2012 |

OTHER PUBLICATIONS

"Rosemount 1199 Seal Systems Manual", Reference Manual 00809-0100-4002 Rev. BB, Nov. 2012.

First Chinese Office Action for Chinese Patent Application No. 201420356550.2, dated Sep. 19, 2014, 4 pages.
International Search Report and Written Opinion for PCT Application No. PCT/US2015/035751, dated Nov. 5, 2015, 13 pages.
Miya, Hironobu et al., "Corrosion Protect DLC Coating on Steel and Hastelloy", Materials Transactions, vol. 49, No. 6 (2008), pp. 1333-1337, The Japan Institute of Metals, 5 pages.
Mirza, Eraj Humayun et al., "Evaluation of Anti-Corrosion Properties of DLC Coatings for Medical Devices", 2012 International Conference on Biomedical Engineering (ICoBE), Feb. 27-28, 2012, Penang, 978-1-4577-1991-2/12/ $26.00, 2011 IEEE, 6 pages.
Office Action from Chinese Patent Application No. 201410306576.0, dated Apr. 25, 2017.
Second Office Action from Chinese Patent Application No. 201410306576.0, dated Nov. 9, 2017, 14 pages.
Office Action from Japanese Patent Application No. 2017-521061, dated Oct. 24, 2017, 12 pages.
Examination Report from Australian Patent Application No. 2015284614, dated Nov. 13, 2017, 4 pages.
Office Action from Canadian Patent Applicat on No. 2,953,804, dated Dec. 14, 2017.
Office Action from European Patent Application No. 15733953.2, dated Feb. 5, 2018.
Examination Report from Australian Patent Application No. 2015284614, dated Feb. 23, 2018.
Office Action from Chinese Patent Application No. 201410306576.0, dated May 23, 2018.
Office Action from Australian Patent Application No. 2015284614, dated Jun. 26, 2018.
Office Action from Canadian Patent Application No. 2,953,804, dated Sep. 5, 2018.
Office Action from Indian Patent Application No. 201627037818, dated Jan. 22, 2019.
Office Action from Chinese Patent Application No. 201410306576.0, dated May 30, 2019.

* cited by examiner

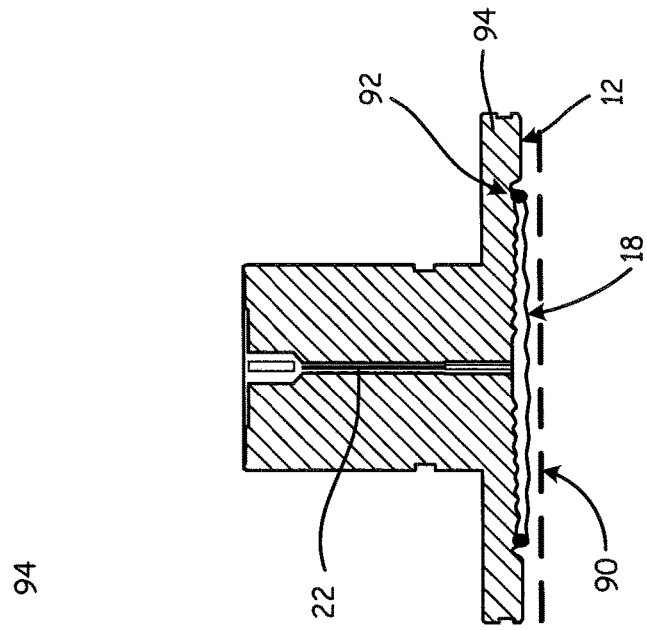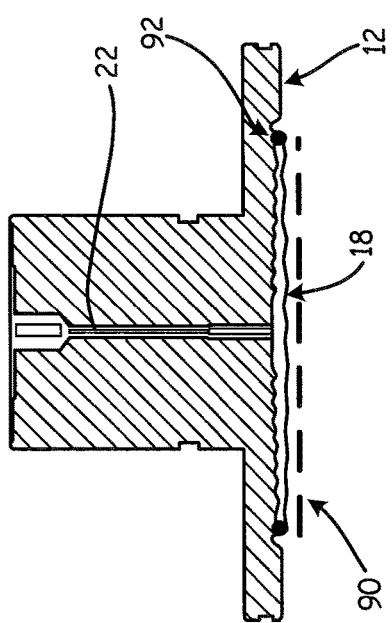

PROCESS PRESSURE TRANSMITTER WITH SEAL HAVING DIAMOND LIKE CARBON COATING

CROSS-REFERENCE TO RELATED APPLICATION

The present application claims priority of Chinese patent application Serial No. 201410306576.0, filed Jun. 30, 2014, the content of which is hereby incorporated by reference in its entirety.

BACKGROUND

The present invention relates to the process control industry. More specifically, the present invention relates to an isolation diaphragm or seal of the type used to couple a process control instrument to a process.

Some types of process control instruments, such as pressure transmitters, have a pressure sensor which is fluidically coupled to an isolation diaphragm by a fill fluid. The isolation diaphragm comprises part of a subassembly called a "remote seal" or a "diaphragm seal" and isolates the pressure sensor from corrosive process fluids being sensed. Pressure is transferred from the isolation diaphragm to the sensor through the fill fluid which is substantially incompressible and fills cavities on both sides and a capillary tube (or thru-hole if the seal is directly mounted to the instrument). The tube is typically flexible and may extend for several meters. The process medium contacts the remote isolation diaphragm which conveys the exerted pressure to the pressure sensor disposed in the transmitter housing.

Typically, the isolation diaphragm and any process wetted parts of the remote seal are made of a corrosion resistant material such that the process medium does not damage the diaphragm. It is also known in the art to provide a coating on the isolation diaphragm in order to protect the isolation diaphragm from corrosion due to contact with the process fluid. However, there is an ongoing need for improved isolation diaphragm protection.

SUMMARY

A process pressure transmitter system includes a process pressure transmitter housing, a process pressure sensor in the process pressure transmitter housing, a flange face in the process pressure transmitter housing and an isolation diaphragm on the flange face. A first capillary passageway carries a first fill fluid from the isolation diaphragm to the process pressure sensor. A process seal diaphragm couples to a process fluid of the industrial process. A second capillary passageway carries a second fill fluid from the process seal diaphragm to the isolation diaphragm. A diamond like carbon (DLC) coating coats the process seal diaphragm.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

BRIEF DESCRIPTION OF THE DRAWINGS

FIGS. 4A, 4B and 4C are cross-sectional views which illustrate example configurations of a diamond like carbon (DLC) coating layer applied to an isolation diaphragm.

DETAILED DESCRIPTION OF ILLUSTRATIVE EMBODIMENTS

Figure 1:
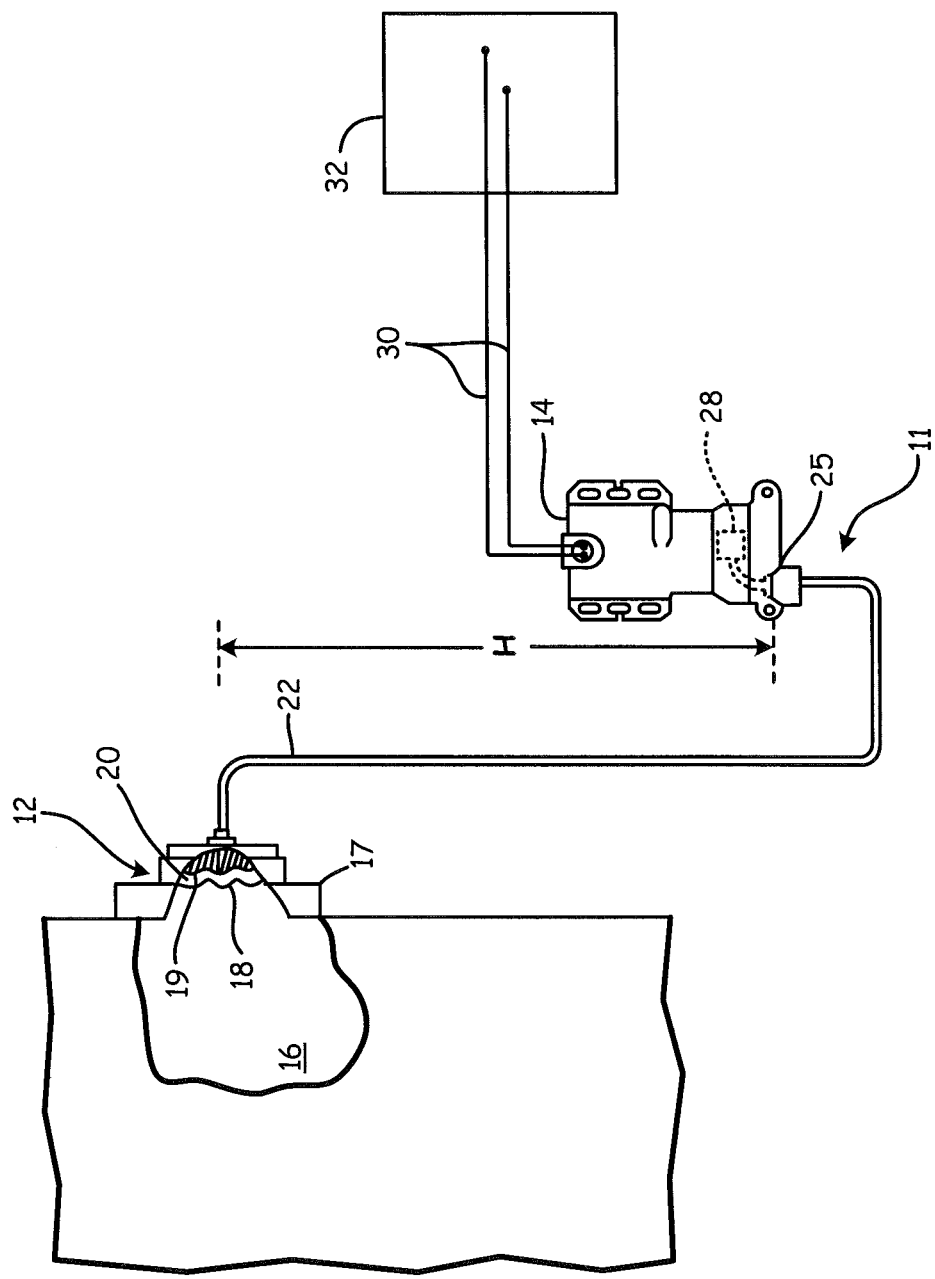
FIG. 1 is a simplified diagram showing a transmitter having a remote seal in accordance with the present invention.

The present invention is a diaphragm seal for coupling a process variable transmitter to an industrial process fluid. The diaphragm seal includes an isolation diaphragm which is coated with diamond like carbon (DLC) to protect the isolation diaphragm from damage due to contact with industrial process fluid. FIG. 1 shows a remote seal 12 of a process variable transmitter 11 Remote seal 12 is connected to a transmitter diaphragm in housing 14. Remote seal 12 includes a housing 17 and is configured to couple to process fluid 16.

Pursuant to one embodiment, transmitter 11 measures the pressure of process medium 16. Remote seal 12 includes a thin flexible diaphragm 18 which contacts process medium 16. Seal 12 also includes backplate 19 which, together with diaphragm 18, define cavity 20. Capillary tube 22 couples cavity 20 to pressure sensor 28 disposed in transmitter housing 14, such coupling being made via transmitter housing diaphragm 25 and a sealed fluid system connecting diaphragm 25 with sensor 28. The sealed fluid system, as well as cavity 20 and capillary tube 22, is filled with a suitable fluid for transmitting the process pressure to sensor 28. The fluid may include silicone, oil, glycerin and water, propylene glycol and water, or any other suitable fluid which preferably is substantially incompressible.

When process pressure is applied from process medium 16, diaphragm 18 displaces fluid, thereby transmitting the measured pressure from remote seal 12 through a passage in plate 19 and through tube 22 to pressure sensor 28. The resulting pressure applied to pressure sensor 28, which can be a capacitance-based pressure cell, causes such capacitance to change as a function of the pressure at medium 16. Sensor 28 can also operate on other known sensing principles, such as strain gauge technology. Circuitry within transmitter housing 14 electronically converts the capacitance into a linear 4-20 mA transmitter output signal over wire pair 30 related to the process pressure. Any appropriate communication protocol may be used including the HART® communication protocol in which digital information is modulated on to a 4-20 mA current, the Foundation Fieldbus or Profibus communication protocols, etc. Process control loop 30 may also be implemented using wireless communication techniques. One example of wireless communication technique is the WirelessHART® communication protocol in accordance with IEC 62591.

Figure 2:
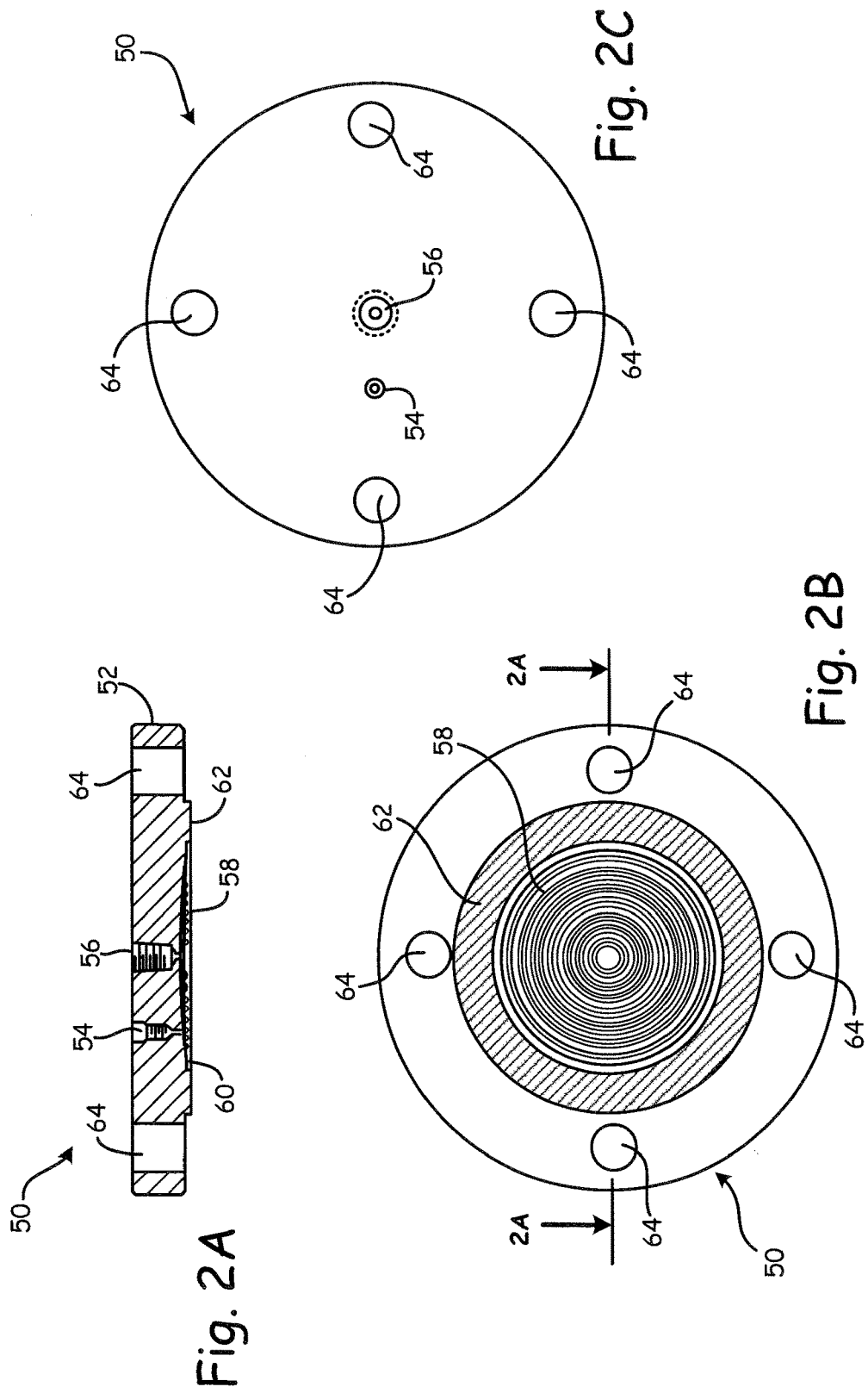
FIG. 2A is a side cross-sectional view taken along a line labeled 2A-2A in FIG. 2B, of a prior art remote seal.
FIG. 2B is a bottom plan view of the prior art remote seal in FIG. 2A.
FIG. 2C is a top plan view of the prior art remote seal of FIG. 2A.

FIG. 2A is a side cross-sectional view, FIG. 2B is a bottom plan view and FIG. 2C is a top plan view of a remote seal 50. Remote seal 50 is referred to as a, "flanged-flush design" and includes seal housing 52. Remote seal 50 also includes a hydraulic fluid (fill fluid) fill port 54, an instrument connection 56, and a flexible diaphragm 58 which is welded by TIG weld 60. Surface 62 provided which is an annular shape and extends around diaphragm 58. Bolt holes 64 are used for coupling housing 52 to, for example, a tank filled with process fluid.

Typically, housing 52 is formed from stainless steel and has a thickness of about 1 inch. Housing 52 is machined in a manner to be welded to the circular metal diaphragm 58. Gasket surface 62 is also machined on housing 52. Diaphragm 58 is typically a foil diaphragm that may be cut and formed with a die press.

Figure 3:
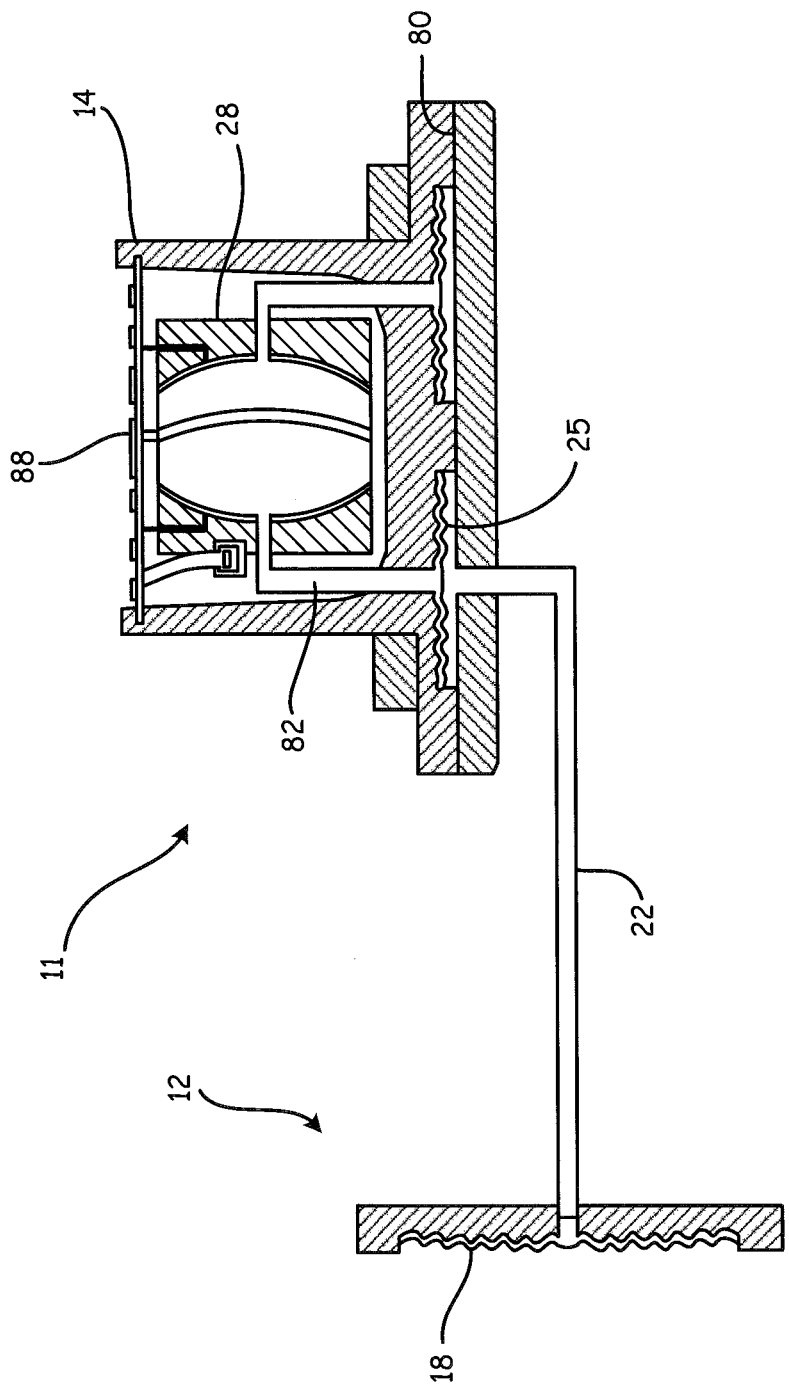
FIG. 3 is a simplified diagram showing a pressure transmitter system including a pressure transmitter coupled to a remote seal.

FIG. 3 is a simplified block diagram showing pressure transmitter system 10 in which process pressure sensor 28 is positioned in process pressure transmitter housing 14. As illustrated in FIG. 3, isolation diaphragm 25 is carried on a flange face 80 of housing 14. A first capillary passageway 82 carries an isolation fill fluid and extends from diaphragm 25 to the pressure sensor 28. Process diaphragm seal 18 couples to a process fluid and a second capillary passageway 22 carries a second fill fluid and extends from the process seal diaphragm 18 to the isolation diaphragm 25. As a pressure is applied to diaphragm 18, the diaphragm 18 flexes. This causes the pressure to be transferred through the second fill fluid to isolation diaphragm 25. In turn, isolation diaphragm 25 flexes and causes the pressure to transferred to the fill fluid in capillary passageway 82. This can be sensed by pressure sensor 28 in accordance with known techniques. Transmitter electronics 88 are used to sense the applied pressure and communicate the information related to the applied pressure to another location.

Figure 4C:
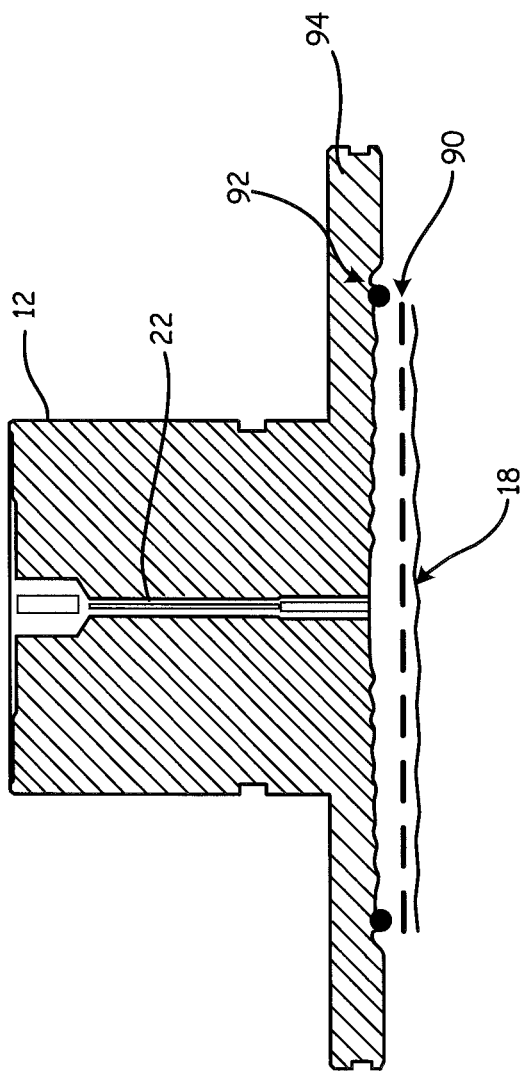

FIG. 4A, FIG. 4B and FIG. 4C are side cross-sectional views showing example configurations of seal 12. In FIGS. 4A and 4B, a diamond like carbon (DLC) coating 90 is applied to an outer surface of the diaphragm 18. In the configuration of FIG. 4A, the DLC coating 90 only covers the diaphragm 18. This configuration will protect the diaphragm 18 from abrasion. Such a configuration may reduce costs and simplify manufacturing. Further, in this configuration, a weld 92 which is used to weld the diaphragm 18 to a flange face 94 of the remote seal 12 may be performed after the coating procedure occurs. This simplifies the manufacturing process.

FIG. 4B shows another example configuration in which the DLC coating 90 extends across the entire wetted surface including face 94. This provides corrosion resistance to all of the surfaces of the seal 12 which may contact process fluid.

FIG. 4C is another example configuration in which the DLC coating 90 is provided on an interior surface of diaphragm 18. This configuration is useful to prevent hydrogen permeation through the diaphragm 18. In such a configuration, the coating 90 is applied to diaphragm 18 prior to welding diaphragm 18 to flange face 94.

The DLC coating 90 can be deposited using any appropriate technique. For example, the coating can be deposited using a physical vapor deposition technique. For example, a filtered cathodic vacuum arc (FCVA) deposition apparatus can be used to deposit the DLC coating 90. In such a device, an electrical arc is applied to a cathodic material causing vaporization and ionization of the material. A magnetic filter field is used to filter the vapor and a magnetic focusing field is used to focus the resulting carbon plasma onto the surface of diaphragm 18 in a vacuum chamber. Various types of diamond like carbon may be deposited as desired.

Figure 5:
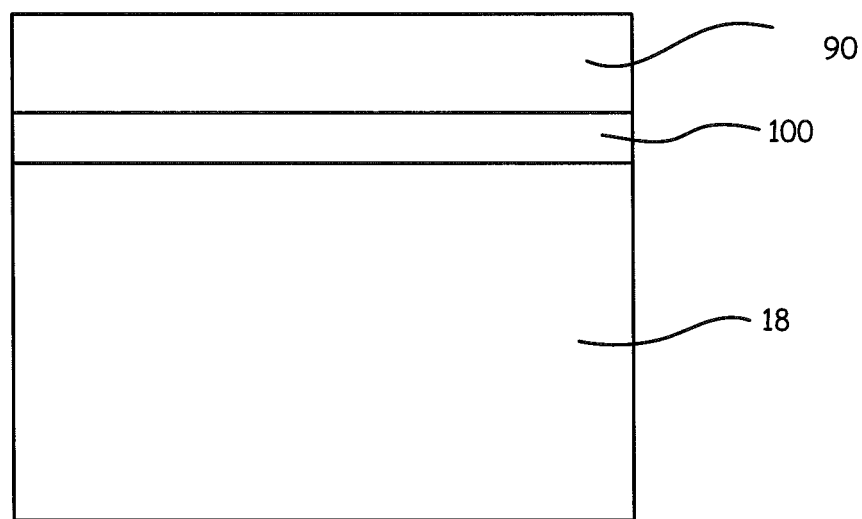
FIG. 5 is an enlarged cross-sectional view showing a portion of a process diaphragm including a diamond like carbon (DLC) coating and an intermediary layer.

FIG. 5 is an enlarged cross-sectional view of a portion of diaphragm 18. As illustrated in FIG. 5, an intermediary layer 100 is deposited between diaphragm 18 and DLC layer 90. The intermediary layer can be selected to promote adhesion of the DLC layer 90 to the diaphragm 18. The intermediary layer 100 can be configured to improve the surface roughness of the diaphragm 18 as well as provide a transition layer having a thermal expansion coefficient which is between the thermal expansion coefficient of diaphragm 18 and DLC coating 90. Further, the intermediary layer 100 can protect the material of diaphragm 18 during the deposition process and improve the corrosion resistance of the final structure. For example, the DLC layer 90 may develop pin holes. Similarly, pin holes may be developed in the diaphragm 18 during the deposition process. The intermediary layer 100 protects the diaphragm 18 during this process. The intermediary layer 100 may be selected as desired. In one configuration, the layer 100 comprises titanium. However, other example materials including tantalum, chromium, or ceramic materials.

Different types of diamond like carbon coatings may be used to fabricate layer 90. In one example embodiment, DLC layer 90 comprises the diamond like carbon coating comprises a-C:H diamond like carbon. In another preferred embodiment, the coating comprises ta-C DLC.

Although the present invention has been described with reference to preferred embodiments, workers skilled in the art will recognize that changes may be made in form and detail without departing from the spirit and scope of the invention. The remote seal may be of a configuration other than those specifically illustrated herein. Examples include flanged seal types such as a flushed flange seal, an extended flanged seal or a pancake seal. Other configurations include threaded seals (RTW), union connection seals, chemical tee seals, threaded pipe mount seals, saddle and flow-through seals, etc. The capillary passageway 22 may be elongate such as that illustrated in FIG. 1, or, in another example configuration, may be relatively short whereby the transmitter mounts directly to the seal. In one configuration, the diaphragm 18 comprises stainless steel. Other example materials include Hastelloy®, tantalum, titanium, Nickel 200/201, Alloy 400 (Monel™), Alloy 625 and 600 (Inconel™), super duplex stainless steel 2507, zirconium, gold, silver, platinum, nickel based alloys, refractory metals and noble metals. In one configuration, any welding is performed prior to depositing the DLC coating. This ensures that the welding process does not damage the DLC coating. The thickness of the DLC coating may be chosen as desired. For example, the thickness may be between 0.5 and 5 μm. In some configurations, a thinner layer is preferred so long as it meets application requirements. Although a single intermediary layer is illustrated, any number of intermediary layers may be employed as desired.

What is claimed is:
1. A process pressure transmitter system, comprising:
   a process pressure transmitter housing;
   a process pressure sensor in the process pressure transmitter housing;
   a flange face in the process pressure transmitter housing;
   an isolation diaphragm on the flange face;
   a first capillary passageway which carries a first fill fluid from the isolation diaphragm to the process pressure sensor;
   a process seal diaphragm configured to couple to a process fluid of the industrial process;
   a second capillary passageway which carries a second fill fluid from the process seal diaphragm to the isolation diaphragm;

a diamond like carbon (DLC) coating applied to an interior surface of the diaphragm which coats the process seal diaphragm; and an intermediary layer between the diamond like carbon coating and the process seal diaphragm which provides a transition layer having a coefficient of thermal expansion which is between a coefficient of thermal expansion of the diamond like carbon coating and a coefficient of thermal expansion of the process seal diaphragm.

2. The apparatus of claim 1 wherein the diamond like carbon comprises ta-C.

3. The apparatus of claim 1 wherein the diamond like carbon comprises a-C:H.

4. The apparatus of claim 1 wherein the intermediary layer comprises titanium.

5. The apparatus of claim 1 wherein the intermediary layer comprises tantalum.

6. The apparatus of claim 1 wherein the intermediary layer comprises chromium.

7. The apparatus of claim 1 wherein the intermediary layer comprises a ceramic.

8. The apparatus of claim 1 wherein the DLC coating is further applied to an exterior surface of the process seal diaphragm.

9. The apparatus of claim 1 wherein the process seal diaphragm is carried in a remote seal and the DLC coating extends across a face of the remote seal.

10. A remote seal for coupling a process pressure transmitter to a process fluid, comprising:

a process seal diaphragm configured to couple to the process fluid of an industrial process;

a capillary passageway which carries a fill fluid from the process seal diaphragm to a distal end to thereby couple a pressure of the process fluid to a pressure sensor of the pressure transmitter;

a diamond like carbon (DLC) coating applied to an interior surface of the diaphragm which coats the process seal diaphragm; and an intermediary layer between the diamond like carbon coating and the process seal diaphragm which provides a transition layer having a coefficient of thermal expansion which is between a coefficient of thermal expansion of the diamond like carbon coating and a coefficient of thermal expansion of the process seal diaphragm.

11. The apparatus of claim 10 wherein the diamond like carbon comprises ta-C.

12. The apparatus of claim 10 wherein the intermediary layer comprises titanium.

13. The apparatus of claim 10 wherein the DLC coating is further applied to an exterior surface of the process seal diaphragm.

14. The apparatus of claim 10 wherein DLC coating extends across a face of the remote seal.

* * * * *